US006434117B1

(12) United States Patent
Momona (10) Patent No.: US 6,434,117 B1
(45) Date of Patent: Aug. 13, 2002

(54) IEEE-1394 SERIAL BUS NETWORK CAPABLE OF MULTICAST COMMUNICATION

(75) Inventor: Morihisa Momona, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/264,189

(22) Filed: Mar. 5, 1999

(30) Foreign Application Priority Data

Mar. 6, 1998 (JP) ............................................. 10-055166

(51) Int. Cl.⁷ .......................... H04L 12/18; H04L 12/40
(52) U.S. Cl. ..................... 370/236; 370/390; 370/401; 370/432; 370/462
(58) Field of Search ............................... 370/235, 236, 370/389, 390, 395.1, 400, 401, 432, 462, 522

(56) References Cited

U.S. PATENT DOCUMENTS

| | | | | |
|---|---|---|---|---|
| 5,784,557 A | * | 7/1998 | Oprescu | 709/220 |
| 5,825,752 A | * | 10/1998 | Fujimori et al. | 370/260 |
| 5,841,989 A | * | 11/1998 | James et al. | 395/200.69 |
| 5,978,578 A | * | 11/1999 | Azarya et al. | 395/701 |

FOREIGN PATENT DOCUMENTS

| | | |
|---|---|---|
| EP | 0 682 430 A2 | 11/1995 |
| EP | 0 766 428 A2 | 4/1997 |
| JP | 8-23584 | 1/1996 |
| JP | 9-93250 | 4/1997 |

OTHER PUBLICATIONS

"A Bus on a Diet—The Serial Bus Alternative. An Introduction to the P1394 High Performance Serial Bus", by M. Teener, Intellectual Leverage, San Francisco, Feb. 24–28, 1992, No. Conf. 37, Feb. 24, 1992, pp. 316–321.
"1394 High Performance Serial Bus: The Digital Interface for ATV", IEEE Transactions on Consumer Electronics, vol. 41, No. 3, pp. 893–900, Aug. 1995, ISSN 0098–3063.

* cited by examiner

*Primary Examiner*—Alpus H. Hsu
*Assistant Examiner*—Roberta Stevens
(74) *Attorney, Agent, or Firm*—Scully, Scott, Murphy & Presser

(57) ABSTRACT

In a communication network where IEEE-1394 nodes are connected to a serial bus, each node functions as a source or a destination for signaling an asynchronous channel setup request containing a multicast address and signaling an asynchronous channel release request. A multicast manager, connected to the bus, includes a channel allocation table having a number of entries each mapping a channel number to a multicast address. The multicast manager responds to the setup request for making a search through the allocation table, setting a node count value to 1, acquiring ownership of a channel number from an isochronous resource manager and mapping the acquired channel number to the multicast address of the request in a corresponding entry of the allocation table if no channel number was mapped to the multicast address or incrementing the node count value by 1 if a channel number is mapped to the multicast address, and then signaling a reply message. The source node responds to this reply message by multicasting asynchronous stream packets to the serial bus. The multicast manager further responds to the asynchronous channel release request for decrementing the node count value by 1. When the node count value equals zero, the ownership of the channel number is restored to the isochronous resource manager and the corresponding entry of the channel allocation table is cleared.

11 Claims, 9 Drawing Sheets

IEEE-1394 SERIAL BUS NETWORK CAPABLE OF MULTICAST COMMUNICATION

BACKGROUND OF THE INVENTION

1. Field of the Invention

The present invention relates generally to IEEE-1394 serial bus systems and more specifically to a serial bus communication on which multicast packets are transmitted over an assigned channel.

2. Description of the Related Art

IEEE Standard for a High Performance Serial Bus (IEEE Std. 1394-1995) specifies broadcast communication using a particular address reserved for this purpose as well as unicast communication by specifying a target node with an identifier assigned to that node. Asynchronous and isochronous data transfer types are available for different types of traffic. Control data traffic is supported by asynchronous packets, while high-volume traffic is carried on isochronous packets at a constant rate.

Study is currently undertaken by a body known as IETF (Internet Engineering Task Force) to enable transmission of connectionless packets such as IP (Internet Protocol) datagrams over the IEEE-1394 serial bus. According to the proposed method for sending a datagram to a destination node having an IP address, the source node first broadcasts the IP address of the destination node to all nodes of the bus. A node having the broadcast address knows that it is targeted and returns a node identifier corresponding to that IP address to the source node. At the source node, the informed node identifier is registered as a destination address of an asynchronous packet, which is transmitted as an IP datagram. While all nodes of the bus can be addressed with the specified broadcast address and each node can be specified for unicast transmission, it is currently impossible to specify a particular group of nodes for multicast transmission.

Asynchronous stream packets are defined by the IEEE-1394 standard as a special case of asynchronous transmission. Similar to the isochronous packet, the asynchronous stream packet uses a channel number rather than a destination node address. It can be transmitted as a multicast packet during a "fairness interval". Possibility thus exists that a single channel is shared by more than one node. In such a multicast mode, however, there is a need to provide some means for communicating the channel number of either asynchronous stream packets or isochronous packets between nodes for the purpose of dynamically setting or releasing a channel.

SUMMARY OF THE INVENTION

It is therefore an object of the present invention to provide a communication network and a method to implement multicast communication for IEEE-1394 nodes.

According to one aspect, the present invention provides a network comprising a plurality of IEEE-1394 nodes connected to a serial bus, each of the nodes functioning as a source node or a destination node for signaling an asynchronous channel setup request containing a multicast address and signaling an asynchronous channel release request. A multicast manager is connected to the serial bus. The multicast manager comprises a channel allocation table having a plurality of entries each mapping a channel number to a multicast address. The multicast manager is responsive to the asynchronous channel setup request for making a search through the table, setting a node count value to 1, acquiring ownership of a channel number from an IEEE-1394 isochronous resource manager and mapping the acquired channel number to the multicast address of the request in a corresponding entry of the allocation table if no channel number was mapped to the multicast address during the search or incrementing the node count value by 1 if a channel number is mapped to the multicast address, and then signaling a reply message. The source node is responsive to the reply message from the multicast manager for multicasting asynchronous stream packets to the serial bus. The multicast manager is further responsive to the asynchronous channel release request for decrementing the node count value by 1. When the node count value equals zero, the multicast manager restores the ownership of the channel number to the isochronous resource manager and clears the corresponding entry of the channel allocation table.

According to a second aspect, the present invention provides a communication network comprising a plurality of IEEE-1394 nodes connected to a serial bus, each of the nodes functioning as a source node or a destination node for signaling an isochronous channel setup request containing session data and signaling an isochronous channel release request, and a multicast manager connected to the serial bus. The multicast manager comprises a channel allocation table having a plurality of entries each mapping a channel number to session data. The multicast manager is responsive to the isochronous channel setup request for making a search through the table, setting a node count value to 1, acquiring ownership of a channel number and necessary channel resource from an IEEE-1394 isochronous resource manager and mapping the channel number and the necessary channel resource to the session data of the request in a corresponding entry of the table if no channel number was mapped to the session data during the search or incrementing the node count value by 1 if a channel number is mapped to the session data during the search, and signaling a reply message. The source node is responsive to the reply message for multicasting isochronous packets to the bus. The multicast manager is responsive to the isochronous channel release packet for decrementing the node count value by 1. When the node count value equals zero, the multicast manager restores the ownership of the channel number and the channel resource to the isochronous resource manager and clears the corresponding entry of the table.

According to a further aspect, the present invention provides a communication network comprising a plurality of IEEE-1394 nodes connected to a serial bus, each of the nodes functioning as a source node for signaling a path message indicating session data and functioning as a destination node for receiving the path message and signaling a first isochronous channel setup request containing the session data indicated in the path message, each of the source and destination nodes signaling an isochronous channel release request, and a multicast manager connected to the serial bus. The multicast manager comprises a channel allocation table having a plurality of entries each mapping a channel number to session data. The multicast manager is responsive to the first isochronous channel setup packet for making a search through the table, setting a node count value to 1, acquiring ownership of an isochronous channel number from an IEEE-1394 isochronous resource manager and mapping the acquired channel number to the session data of the packet in a corresponding entry of the table if no channel number was mapped to the session data during the search or incrementing the node count value by 1 if a channel number is mapped to the session data during the search, and signaling a first reply message. The destination node is responsive to the first reply message for signaling a reservation message indicating a desired channel resource, and the source node is responsive to the reservation message for signaling a second isochronous channel setup request containing the channel resource indicated in the reservation message. The multicast manager is responsive to the second isochronous channel setup request for determining necessary channel resource from a resource value in the corresponding entry of the allocation table, acquiring ownership of the necessary channel resource from the isochronous resource manager and updating the resource value with the acquired channel resource and signaling a second reply message. The source node is responsive to the second reply message from the multicast manager for multicasting isochronous packets to the bus. The multicast manager is responsive to the isochronous channel release request for decrementing the node count value by 1. When the node count value equals zero, the multicast manager restores the ownership of the channel number and the channel resource to the isochronous resource manager and clears the corresponding entry of the table.

BRIEF DESCRIPTION OF THE DRAWINGS

The present invention will be described in further detail with reference to the accompanying drawings, in which.

DETAILED DESCRIPTION

Figure 1:
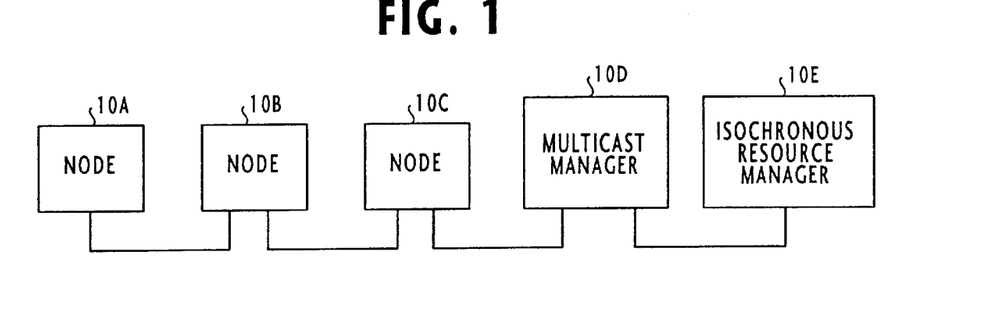
FIG. 1 is a block diagram of an IEEE 1394 serial bus network embodying the present invention.

In FIG. 1, a typical example of the IEEE 1394 serial bus system is illustrated, in which five nodes 10A to 10E are provided. Each node has a communication protocol such as the Internet Protocol. In the following description, the node 10A will be explained as a source node, 10C as a destination node with the intermediate node 10B functioning as a repeater between nodes 10A and 10C. Node 10C also functions as a repeater when a packet (asynchronous) is exchanged between nodes 10A and 10D. Node 10D is a multicast manager that performs the management of channels allocated for multicast communications and quality-of-service parameters (such as the bandwidth of allocated channels) by co-operating with a node 10E that assumes the role of an isochronous resource manager. Note that these manager functions may be combined and implemented in a single node. Although not shown in FIG. 1, each node has a physical layer connected to the 1394 serial bus, a link layer, and a transaction layer. The link layer is connected to an application layer for isochronous transactions as well as to the transaction layer for asynchronous transactions.

Figure 2:
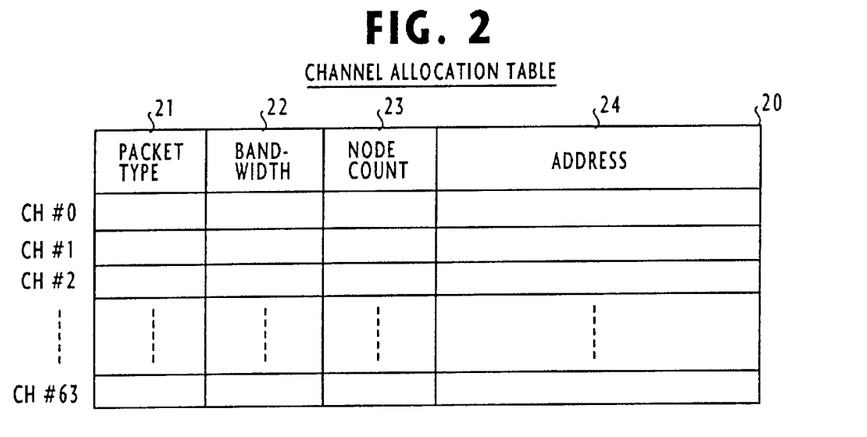
FIG. 2 is an illustration of a channel allocation table resident in a multicast manager.

According to the present invention, the multicast manager 10D is provided with a channel allocation table 20, as illustrated in FIG. 2. Channel allocation table 20 has a plurality of channel entries corresponding to channel numbers "0" to "63".

Each channel entry of the channel allocation table 20 is divided into fields 21 to 24. Field 21 is a packet type field that is used for indicating whether the packet to be used for a data transfer is an isochronous packet that is transmitted at a constant rate in a multicast mode within nominal cycle period of 125 $\mu$s or an asynchronous stream packet that is transmitted in a multicast mode within an interval known as "fairness interval" between two arbitration reset gaps. Field 22 is a bandwidth field in which allocated bandwidth is indicated if the packet is of isochronous type. A node count is given in the field 23 to indicate the number of nodes participating in a single data transfer, regardless of the types of packets being used. Field 24 is an address field in which a multicast address is indicated if data transfer involves the use of asynchronous stream packets. If data transfer mode is isochronous, session data (destination node address, protocol number and port number) are indicated in the address field 24.

Figure 3:
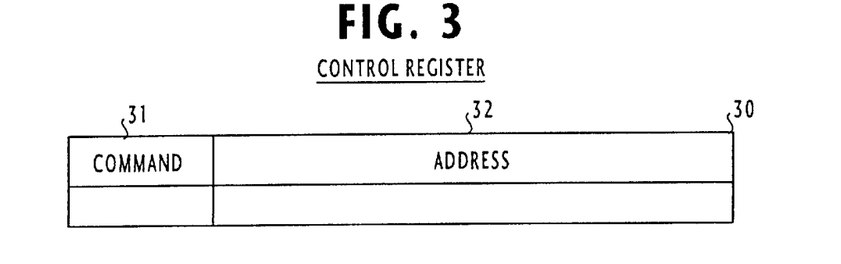
FIG. 3 is an illustration of an control register resident in the multicast manager to be directly set by a requesting node and read by the multicast manager when establishing an asynchronous multicast-mode channel or an isochronous multicast-mode channel.

Multicast manager 10D is further provided with a control register 30 as shown in FIG. 3. Control register 30 is defined in the CSR (control and status register) architecture register space of the IEEE 1394 standard and has a command field 31 for giving one of a predefined set of indications (asynchronous-mode channel setup and release and isochronous-mode channel setup and release) and an address field 32 in which a multicast address is indicated when data transfer mode is asynchronous or session data (destination node address, protocol number and port number) when the transfer mode is isochronous. Control register 30 is written directly by a node requesting the starting or ending of a communication and the multicast manager 10D reads the contents of the register 30 and knows that a request is made from one of the nodes of the network.

Figure 4:
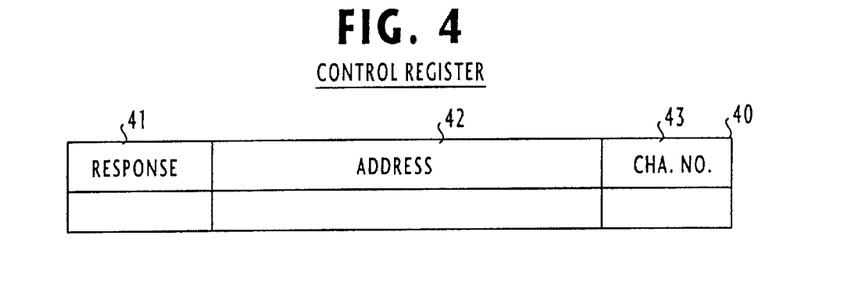
FIG. 4 is an illustration of an control register resident in an IEEE-1394 node to be directly set by the multicast manager and read by the requesting node when establishing an asynchronous multicast-mode channel or an isochronous multicast-mode channel.

Each of the nodes 10A to 10C is provided with a control register 40, which is also defined in the CSR architecture register space, as shown in FIG. 4. This control register has a response field 41, an address field 42 and a channel number field 43. Response field 41 is used to indicate multicast (asynchronous-mode) channel setup indication or isochronous-mode channel setup indication, and the address field 42 is used to store a multicast address in the case of asynchronous mode and session data during isochronous transfer mode. Control register 40 of each node is directly written by the multicast manager 10D and the node reads the contents of the register 40 and knows that a response action is taken by the multicast manager 10D.

Figure 5A:
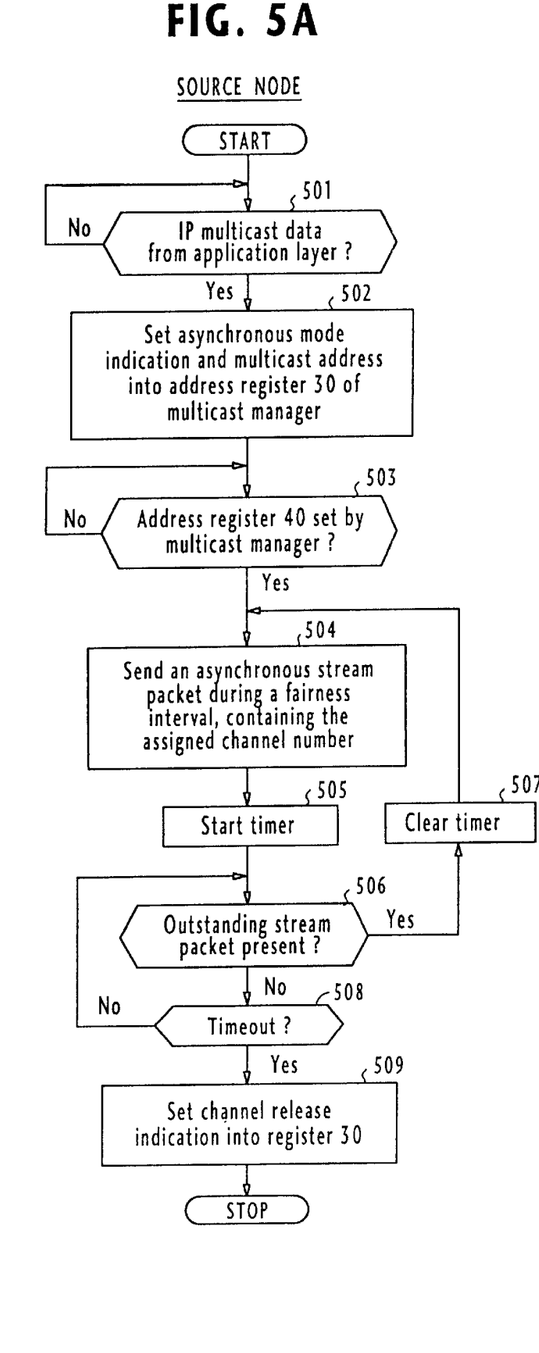
FIG. 5A is a flowchart of the operation of a source node of the network when requesting the transmission of multicast asynchronous stream packets according to a first embodiment of the present invention.
Figure 5B:
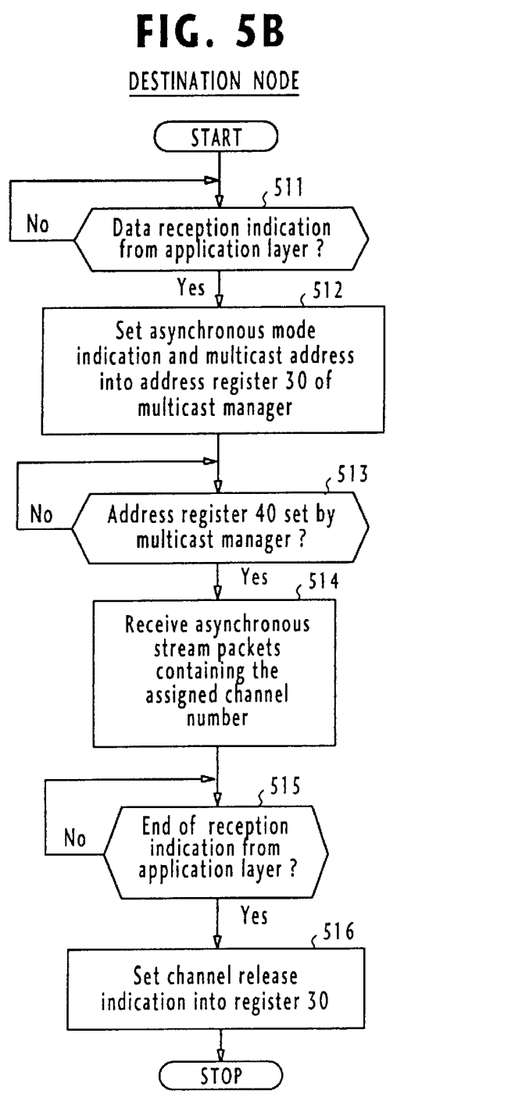
FIG. 5B is a flowchart of the operation of a destination node when requesting the reception of multicast asynchronous stream packets according to the first embodiment of the present invention.

FIG. 5A is the flowchart of the operation of the transaction layer of source node 10A when transmission of asynchronous stream packets is initiated from the application layer of the node, and FIG. 5B is the flowchart of the operation of the transaction layer of destination node 10C when reception of such multicast packets is requested from the application layer of the node.

Specifically, in FIG. 5A, the transaction layer at the source node checks for the presence of IP multicast data from the application layer software (step 501). If IP multicast data is detected, the transaction layer proceeds from step 501 to step 502 to send a request containing a multicast address for setting up an asynchronous-mode channel. This is done by directly setting the control register 30 of the multicast manager 10D with an asynchronous mode indication and a multicast address. Multicast manager 10D knows that it has received a request from a node, and sends a reply to the requesting node. This is achieved by the multicast manager 10D by directly setting the control register 40 of the requesting node with a response indication, the multicast address of the node and a channel number obtained from the isochronous resource manager 10E. When the reply indication is set in the control register 40 (step 503), the source node 10A is conditioned to send asynchronous stream packets containing the assigned channel number in their channel number field. At step 504, an asynchronous stream packet is sent during a "fairness interval" which is designed into the transaction layer of the node by the 1394 Standard so that each node wishing to initiate a transaction is given fair access to the bus.

Following the transmission of an asynchronous stream packet, a timer is started (step 505) and a test is made at step 506 for the presence of an outstanding asynchronous stream packet of the same multicast address as one transmitted at step 504. If there is one, the decision at step 506 is affirmative and flow proceeds to step 507 to clear the timer and returns to step 504 to repeat the asynchronous stream packet transmission, timer start-up and packet presence test. If there is no outstanding asynchronous stream packet, the decision at step 506 is negative and flow proceeds to step 508 to check to see if the timer has timed out. If the timer is still running, flow loops steps 506 and 508 so that, if an asynchronous stream packet occurs before the timer times out, it is transmitted in a fairness interval. If the timer times, it is concluded that there are no more packets to transmit and flow proceeds from step 508 to step 509 to set a channel release indication into the control register 30 of the multicast manager 10D.

In FIG. 5B, the operation of the destination node 10C begins at step 511 when the transaction layer of the node receives a data reception indication from its application layer. The transaction layer of node 10C proceeds from step 511 to step 512 to send a request containing a multicast address for setting up an asynchronous-mode channel. This is done by directly setting the control register 30 of the multicast manager 10D with an asynchronous mode indication and a multicast address in the same manner as performed by the source node at step 502. Multicast manager 10D knows that it has received a request from a node, and sends a reply to the destination node. This is also achieved by the multicast manager by directly setting the control register 40 of the destination node with a response indication, the multicast address of the destination node and a channel number obtained from the isochronous resource manager 10E. When the reply indication is set in the control register 40 (step 513), the destination node 10C is conditioned to receive asynchronous stream packets containing the assigned channel number in their channel number field (step 514). If an end-of-reception indication is given by the application layer of the destination node (step 515), the transaction layer terminates the routine by setting a channel release indication into the control register 30 of the multicast manager (step 516).

Figure 6:
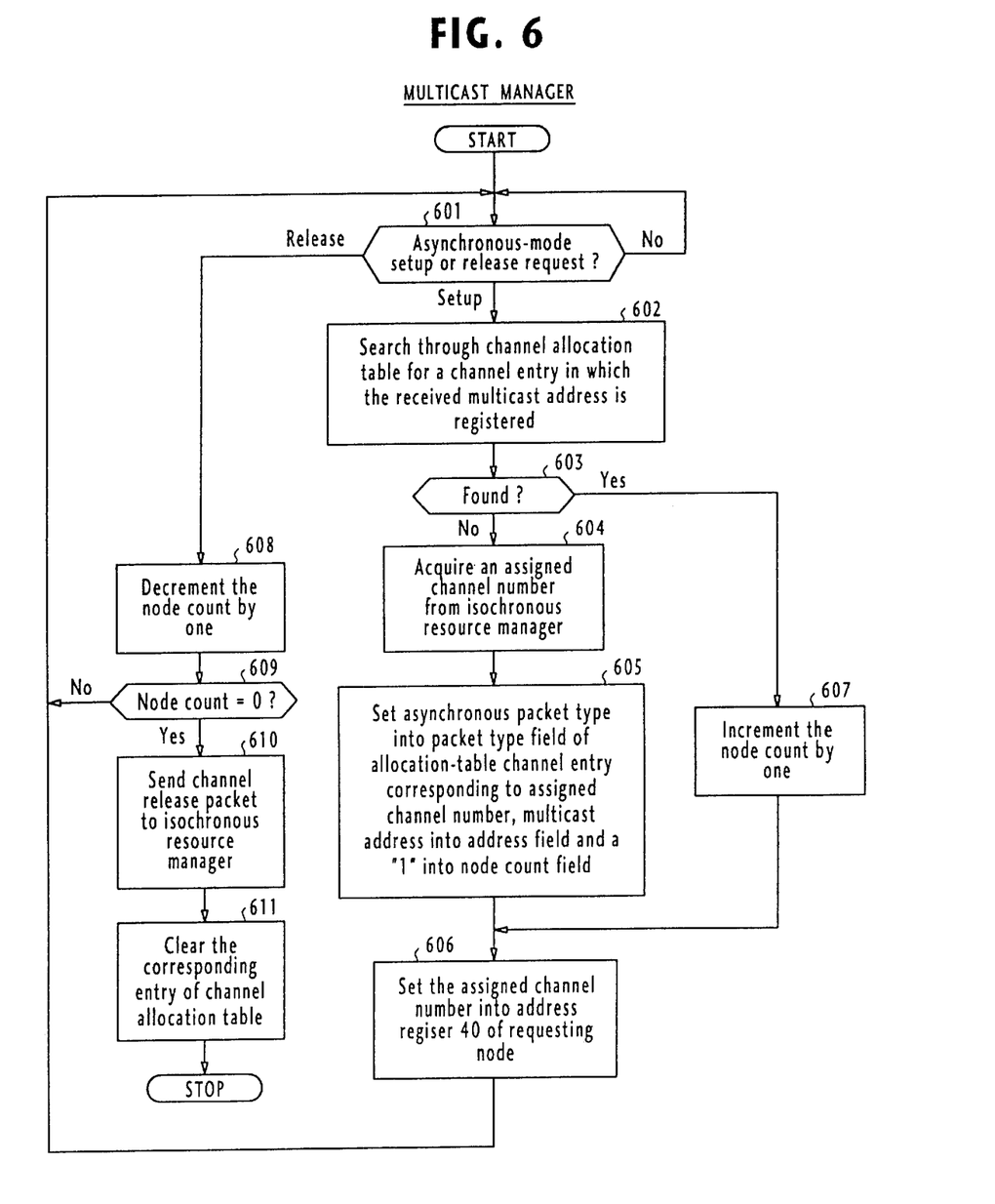
FIG. 6 is a flowchart of the operation of the multicast manager cooperating with requesting nodes which operates according to the flowchart of FIG. 5.

The operation of the multicast manager 10D in response to the requests for asynchronous stream packets from the source and destination nodes will be explained with the aid of the flowchart of FIG. 6.

Multicast manager 10D starts its operation at step 601 at which it checks to see if an asynchronous-mode channel setup request or an asynchronous-mode channel release request is received from a node. This is achieved by checking the contents of the control register 30 to see whether necessary data are set by a requesting node. If an asynchronous-mode channel setup indication is set in the register 30, flow proceeds from step 601 to step 602 to make a search through the channel allocation table 20 for a channel entry in which received multicast address is registered.

If there is no channel entry containing that multicast address, flow proceeds from step 603 to step 604 to send a channel assignment request to the isochronous resource manager 10E to acquire ownership of a channel. If a channel is available, a channel number is assigned by the isochronous resource manager and the multicast manager 10D is informed of the assigned channel number.

At step 605, an asynchronous packet type indication is set into the packet type field 21 of a channel entry of the allocation table 20 that corresponds to the assigned channel number and the multicast address stored in the control register 30 is set into the address field 24 of that channel entry and a "1" is set into the node count field 23. In this way, a channel number is mapped to the multicast address of an asynchronous channel setup request.

At step 606, the multicast manager sends a reply packet to the source node to inform it of the channel number mapped in the corresponding entry of the-allocation table 20, and returns to the starting point of the routine.

If an asynchronous-mode channel setup request is received from another node, the multicast manager will repeat steps 602 and 603, so that a new multicast address is set by that node into the address field 32 of register 30. If the new multicast address is the same as the one set in the address field 24 of allocation table 20, the decision at step 603 will be affirmative, and flow proceeds to step 607 to increment the value of node count field 23 by one, and proceeds to step 606 to send a reply message to the requesting node by setting its control register 40 with the channel number already assigned to the node 10A. In this manner, the node count value represents the number of nodes using the same asynchronous channel.

If the source node ceases to send asynchronous stream packets, it sends a channel release request by setting the control register 30 with a release indication (step 509, FIG. 5A). In a similar manner, when the destination node ceases to receive asynchronous stream packets, it sends a channel release request by setting the control register 30 with a release indication (step 516, FIG. 5B).

In response to each of such release requests, the multicast manager 10D, which is looping step 601, proceeds to step 608 to decrement the value in the node count field 23 by one and checks to see if the node count equals zero (step 609). If the node count is not equal to zero, flow returns from step 609 to step 601. If the node count is zero, flow proceeds to step 610 to send a channel release packet to the isochronous resource manager 10E to restore the ownership of the assigned channel, and concludes the routine with step 611 by clearing the contents of the appropriate channel entry of allocation table 20.

The operation of the asynchronous transactions will be fully understood by the following description with the aid of the sequence diagrams of FIGS. 7 to 10.

Figure 7:
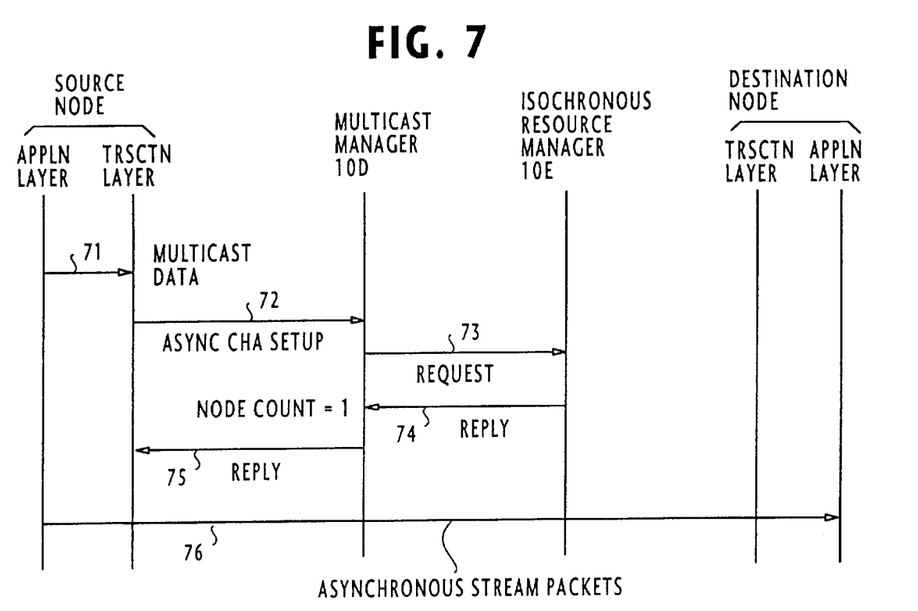
FIGS. 7 to 10 are sequence diagrams illustrating asynchronous transactions associated with the flowcharts of FIGS. 5 and 6.

In FIG. 7, when the application layer of source node 10A generates IP multicast data 71, its transaction layer sends an asynchronous-mode channel setup packet 72 to the multicast manager 10D. In response, the multicast manager searches the channel allocation table 20 and sends a channel request 73 to the isochronous resource manager 10E if no channel number is assigned to the multicast address sent with the setup packet from node 10A. If the source node 10A is the first to send the asynchronous-mode channel setup packet, a channel number is assigned and informed to the multicast manager 10D via a reply packet 74. Multicast manager 10D sets a "1" into the node count field of the allocation table and sends a reply packet 75 to the source node 10A to inform it of the assigned channel number. Source node 10A sends asynchronous stream packets 76 during fairness intervals to the application layer of destination node 10C, using the assigned channel.

Figure 8:
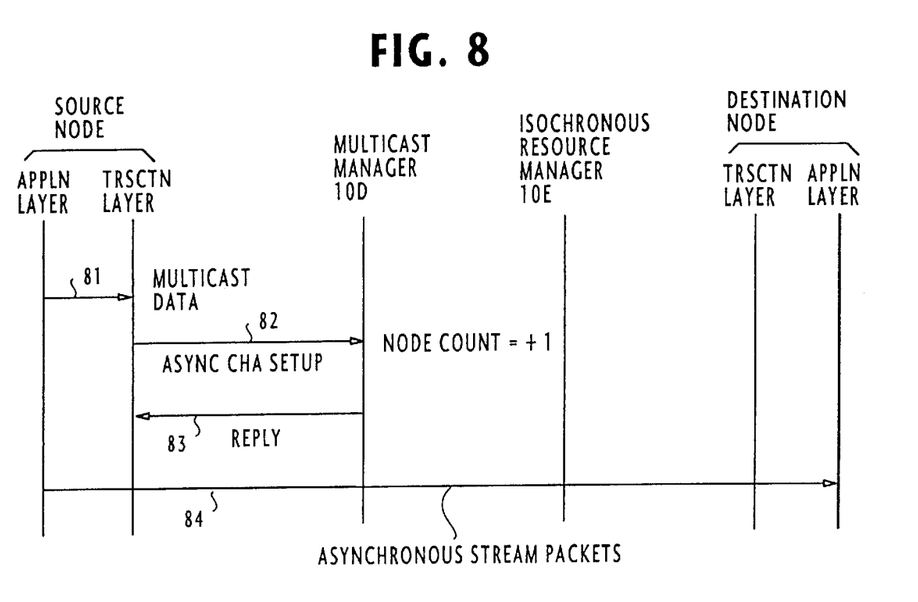

In FIG. 8, with an asynchronous channel being established as described above, if the application layer of another source node generates IP multicast data 81, its transaction layer sends an asynchronous-mode channel setup packet 82 to the multicast manager 10D, containing the same multicast address as that used by the node 10A. In response, the multicast manager searches the channel allocation table 20, knows that the multicast address just received is already assigned a channel number, increments the node count by one and sends a reply packet 83 to the new source node to inform it of the already assigned channel number. The new source node sends asynchronous stream packets 84 during fairness intervals to the application layer of destination node 10C, using the assigned channel.

Figure 9:
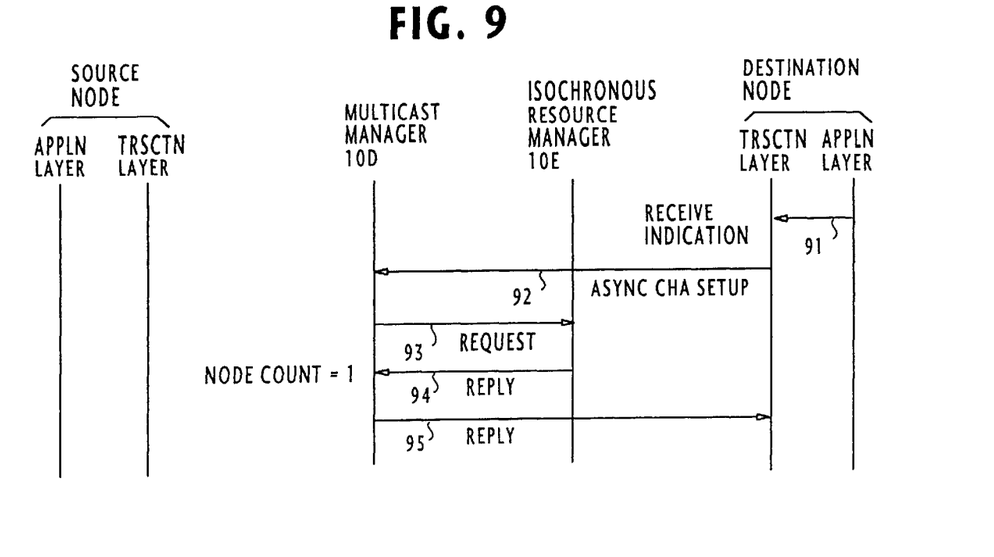

In FIG. 9, when the application layer of destination node 10C gives an indication 91 to the transaction layer that IP multicast data be received from a source node, the transaction layer sends an asynchronous-mode channel setup packet 92 to the multicast manager 10D, containing a multicast address. In response, the multicast manager searches the channel allocation table 20 and sends a channel request 93 to the isochronous resource manager 10E if no channel number is assigned to the multicast address sent with the setup packet from node 10C If the destination node 10C is the first to send the asynchronous-mode channel setup packet, a channel number is assigned and informed to the multicast manager 10D via a reply packet 94. Multicast manager 10D sets a "1" into the node count field of the allocation table and sends a reply packet 95 to the destination node 10C to inform it of the assigned channel number. Destination node 10C is now ready to receive asynchronous stream packets which contains the channel number indicated by the reply packet 95 from the multicast manager 10E.

Figure 10:
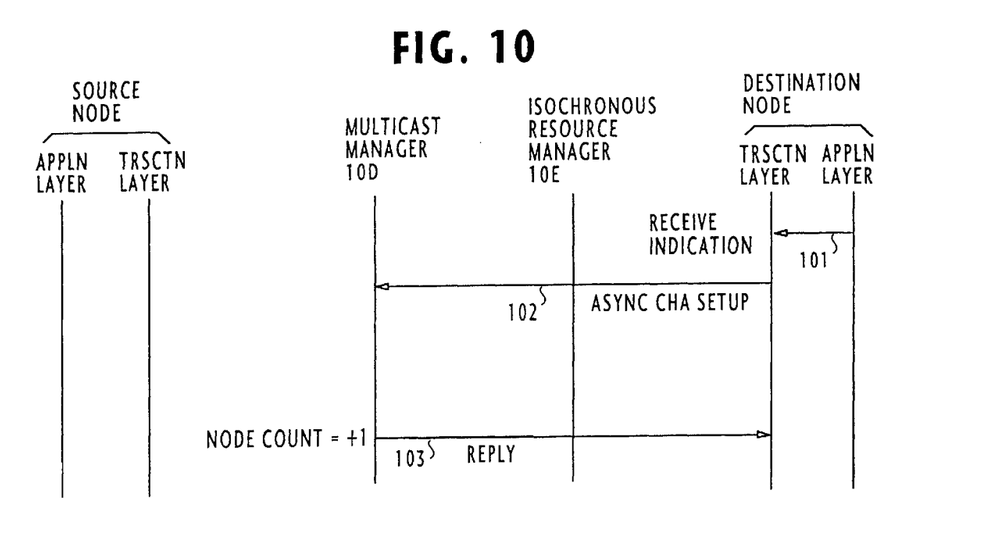

In FIG. 10, when the application layer of another destination node gives an indication 101 to its transaction layer that IP multicast data be received from a source node, the transaction layer sends an asynchronous-mode channel setup packet 102 to the multicast manager 10D, containing a multicast address. In response, the multicast manager searches the channel allocation table 20 and knows that the multicast address just received is already assigned a channel number, and it increments the node count by one and sends a reply packet 103 to the new destination node to inform it of the already assigned channel number.

The value in the node count field 23 of allocation table 20 in the multicast manager 10D is decremented by one in response to an asynchronous-mode channel release packet received from the transaction layer of a source node if asynchronous stream packets are not transmitted for a predetermined interval or from the transaction layer of a destination node if it is notified with an end-of-communication indication from the application layer of the node. When the node count value is reduced to zero, the multicast manager requests the isochronous resource manager to release the asynchronous multicast channel.

Figure 11A:
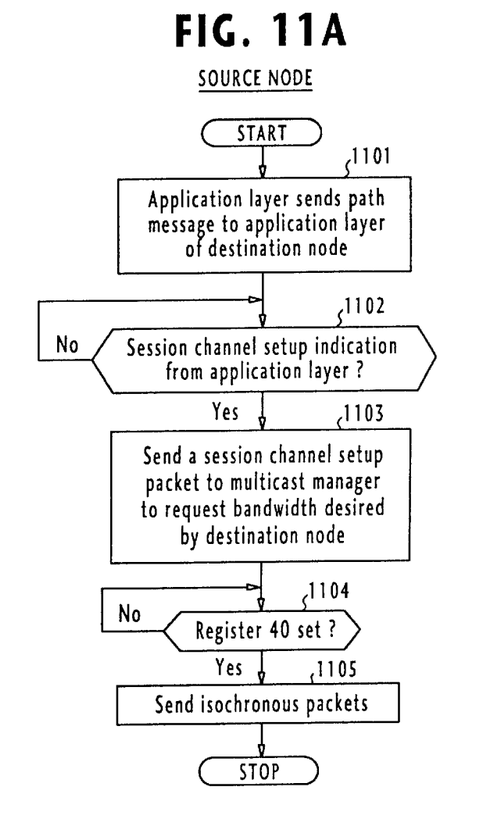
FIGS. 11A and 11B are flowcharts of the operation of a source node requesting an isochronous channel according to a second embodiment of the present invention.
Figure 11B:
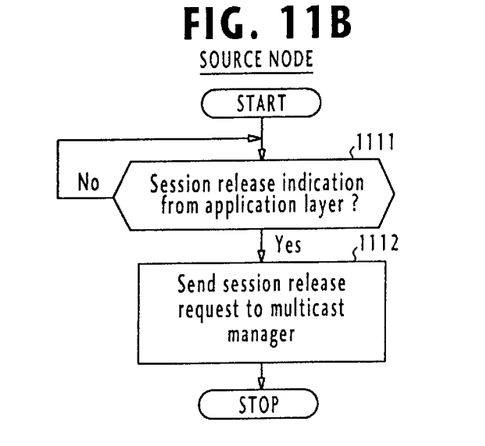
Figure 12:
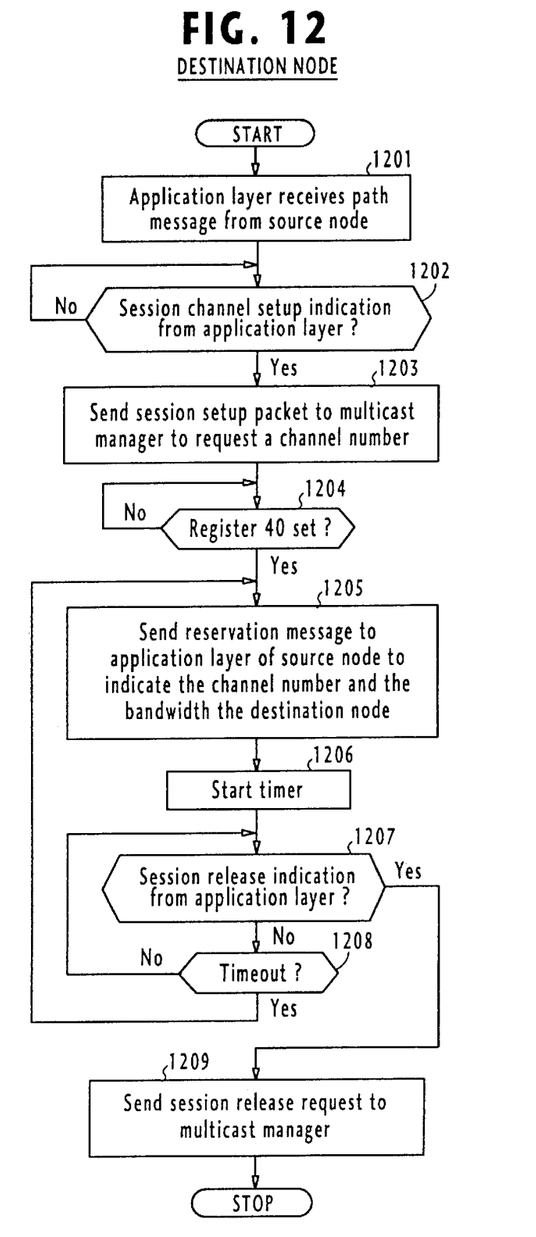
FIG. 12 is a flowchart of the operation of a destination node requesting the reception of multicast isochronous packets according to the second embodiment of the present invention.

FIGS. 11A and 11B are the flowcharts of the operation of the link layer of source node 10A when transmission of multicast isochronous packets is initiated from the application layer of the node, using a bandwidth control protocol such as RSVP (resource reservation protocol). FIG. 12 is the flowchart of the operation of the link layer of destination node 10C when reception of such isochronous packets is requested from the application layer of the node 10C.

In FIG. 11A, the application layer of node 10A sends a message known as "path" message to the application layer of destination node 10C to inform it of path data of the source-destination communication link (step 1101).

In FIG. 12, when the application layer of node 10C receives the path message from the source node 10A, it applies a session (isochronous-mode) channel setup indication to the link layer (step 1201). When the link layer receives this session setup indication (step 1202), it sends a session setup request to the multicast manager 10D by setting its control register 30 with an isochronous channel setup indication (step 1203). If the request is granted, a channel number is sent from the multicast manager with a reply message which is set into the control register 40 of node 10C (step 1204). Therefore, a channel setup indication, session data (destination node address, protocol number and port number) and the assigned channel number are respectively stored in the fields 41, 42 and 43 of control register 40.

Flow proceeds to step 1205 to send a reservation message from the application layer of destination node 10C to the application layer of source node 10A, indicating the bandwidth the destination node wishes to receive through the assigned channel. Reservation is "refreshed" by repeatedly transmitting reservation messages. For this purpose, a timer is started (step 1206) following the execution of step 1205.

At step 1207, the reception of a session release indication from the application layer is checked. If the decision at step 1207 is negative, the timer is checked at step 1208 for expiration. When the timer expires, flow returns from step 1208 to step 1205 to repeat the transmission of a reservation message and start the timer again.

When no reservation message is transmitted during the time-out period of the timer, a session release indication will be issued from the application layer and flow exits the loop and enters step 1209 to terminate the routine by sending a session release request from the destination node 10C to the multicast manager 10D by appropriately setting its control register 30.

Returning to FIG. 11A, a reservation message from the destination node is received by the application layer of the source node and a session channel setup indication is issued to the link layer (step 1102).

At step 1103, the source node 10A sends a session channel setup request to the multicast manager 10D for requesting the bandwidth desired by the destination node 10C. This is done by setting the control register 30 of manager 10D with the session data and the bandwidth data received with the reservation message from the destination node. If the request is granted, a reply packet is transmitted from the multicast manager to the source node where the control register 40 is set with the assigned channel number (step 1104).

At step 1105, the source node begins sending isochronous packets with the assigned channel number to the destination node.

After sending isochronous packets, the source node checks to see if session release indication is received from its application layer (step 1111, FIG. 11B). If so, flow proceeds to step 1112 to send a session release request to the multicast manager 10D by setting its control register 30 with a session release indication and the session data.

Figure 13:
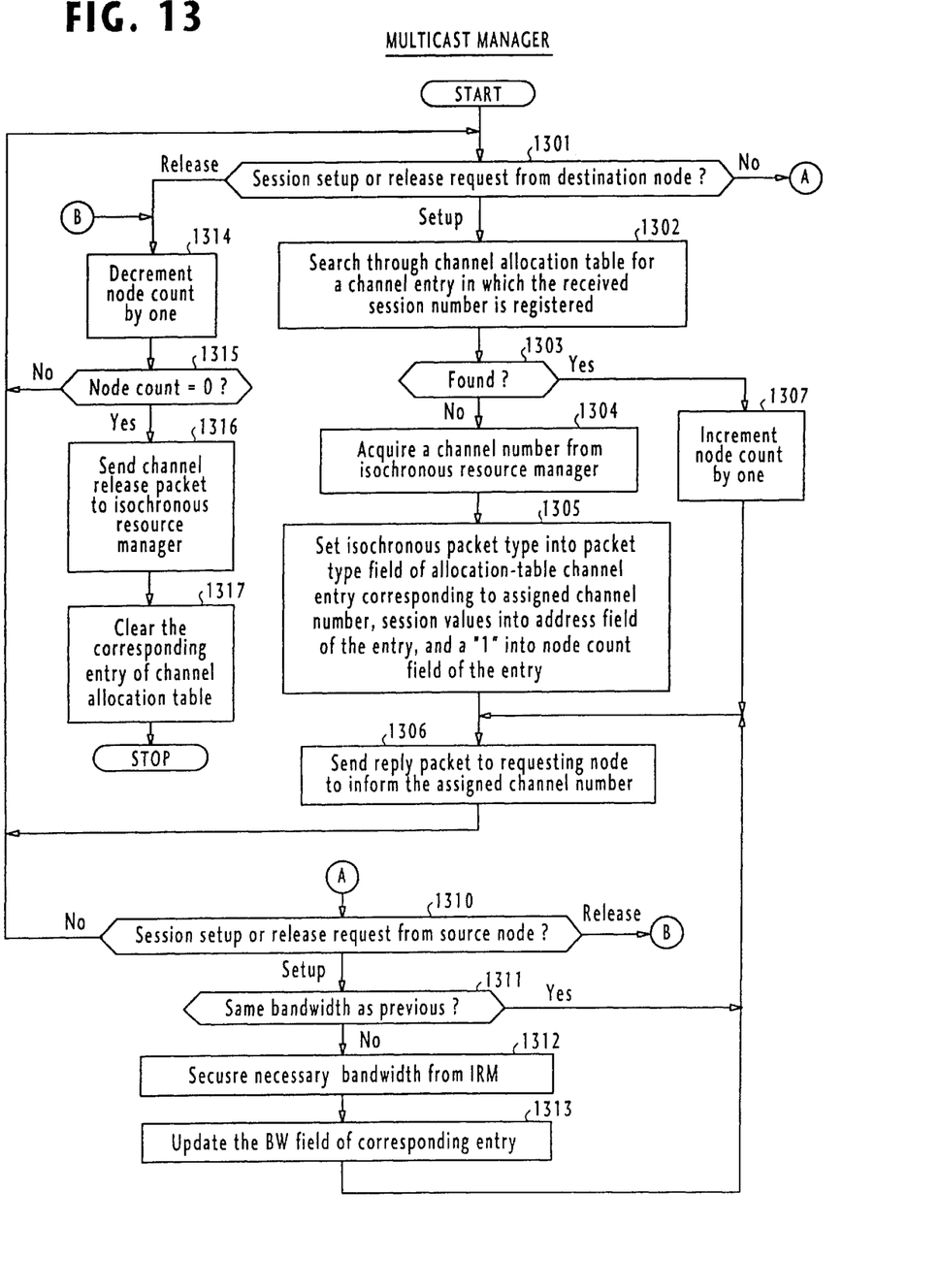
FIG. 13 is a flowchart of the operation of the multicast manager cooperating with the nodes operating according to the flowcharts of FIGS. 11A, 11B and 12.

The operation of the multicast manager 10D in response to the request for isochronous packets will be explained with the aid of the flowchart of FIG. 13.

The operation of multicast manager 10D begins with step 1301 by checking the receipt of a session setup request or a session release request from the destination node 10C by examining its control register 30. When a session setup request is received from the destination node 10C, flow proceeds from step 1301 to step 1302 to search through the channel allocation table 20 for a channel entry in which the session data now stored in the control register 30 are registered. If they are not registered in the allocation table (step 1303), flow proceeds to step 1304 to send a request to the isochronous resource manager 10E to acquire ownership of a channel number. When a channel number is granted from the isochronous resource manger, the multicast manager proceeds to step 1305 to set an isochronous packet type indication into the packet type field 21 of the allocation-table channel entry corresponding to the assigned channel number, a "1" into the node count field 23 and session data into the address field 24 (step 1306). Following the execution of step 1305, flow proceeds to step 1306 to send a reply message to the destination node by setting its control register 40 with the assigned channel number, and then returns to the beginning of the routine for looping steps 1301 and 1310 to check for the arrival of a further request from a source or a destination node.

If the decision at step 1303 is affirmative in response to receipt of a subsequent packet from another destination node, the node count value of the allocation table 20 is incremented by one at step 1307 and a reply message containing the assigned channel number is set into the control register 40 of the requesting destination node (step 1306).

The application layer at the destination node 10C will then repeatedly send a reservation message to the application layer of source node 10A to inform the bandwidth the destination node is ready to receive (step 1206, FIG. 12). In response to each reservation message, the source node 10A sends a session setup request to the multicast manager 10D according to the resource reservation protocol (steps 1101 to 1103, FIG. 11A).

The session setup request from the source node 10A is detected at step 1310. Since the resource reservation protocol is a receiver-oriented protocol, this request contains the bandwidth the destination node 10C is ready to receive as well as the session data. In response to this request, the multicast manager 10D proceeds to step 1311 to compare the bandwidth requested by the destination node with a value currently set in the bandwidth field of the corresponding entry of allocation table 20.

If the source node 10A is the first to send a path message for the current session, the value set in the bandwidth field of the corresponding entry is zero, and hence the decision at step 1311 is negative and flow proceeds to step 1312 to secure ownership of the requested bandwidth from the isochronous resource manager 10E. When the requested bandwidth is granted, the bandwidth field of the corresponding allocation channel entry is updated with the granted channel resource (step 1313). Flow proceeds to step 1306 to send a reply message to the source node 10A to inform the assigned channel number. This channel number and the corresponding session data are set into the control register 40 of the source node.

If the source node 10A is not the first to send a path message, the compared values at step 1311 may be equal to each other, and flow returns from step 1311 to step 1306 to send a reply message to the source node to indicate the channel number which already been assigned. If the requested bandwidth is greater than the currently allocated value, the multicast manager determines the deficit channel resource and request it from the isochronous resource manager (step 1312), updates the bandwidth field of the corresponding channel entry (step 1313) and informs the source node of the channel number and the session data (step 1306). If the requested bandwidth is smaller than the currently allocated value, the multicast manager determines a surplus value and restores the ownership of the surplus resource to the isochronous resource manager (step 1312) and updates the bandwidth field of the corresponding channel entry (step 1313) and proceeds to step 1306 to inform the channel number and session data.

At the end of a session, either a source node or a destination node issues a session release request. After looping steps 1301 and 1310, the multicast manager 10D proceeds exits from step 1301 in response to receipt of a session release request from a destination node or from step 1310 in response to receipt of a session release request from a source node and enters step 1314 to decrement the node count value by one.

At step 1315, the node count is examined. If it is not equal to zero, flow returns to step 1301. Otherwise, flow proceeds to step 1316 to send a channel release message to the isochronous resource manager 10E to restore the ownership of the assigned channel, and terminates the routine after clearing the corresponding channel entry of the allocation table 20 (step 1317).

Figure 14:
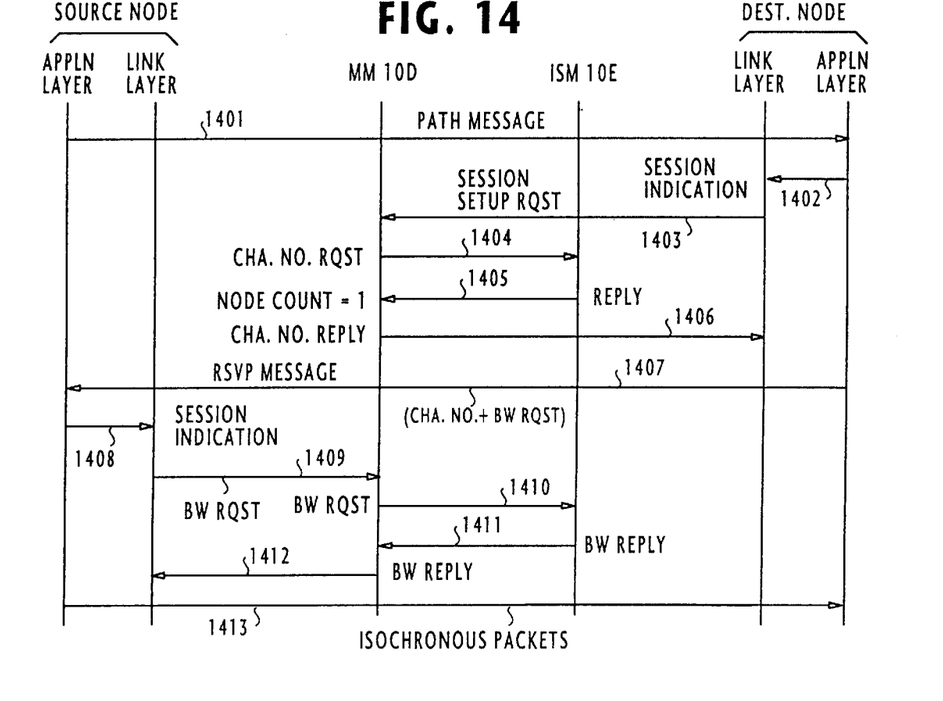
FIGS. 14 to 16 are sequence diagrams illustrating isochronous transactions associated with the flowcharts of FIGS. 11A, 11B, 12 and 13.
Figure 15:
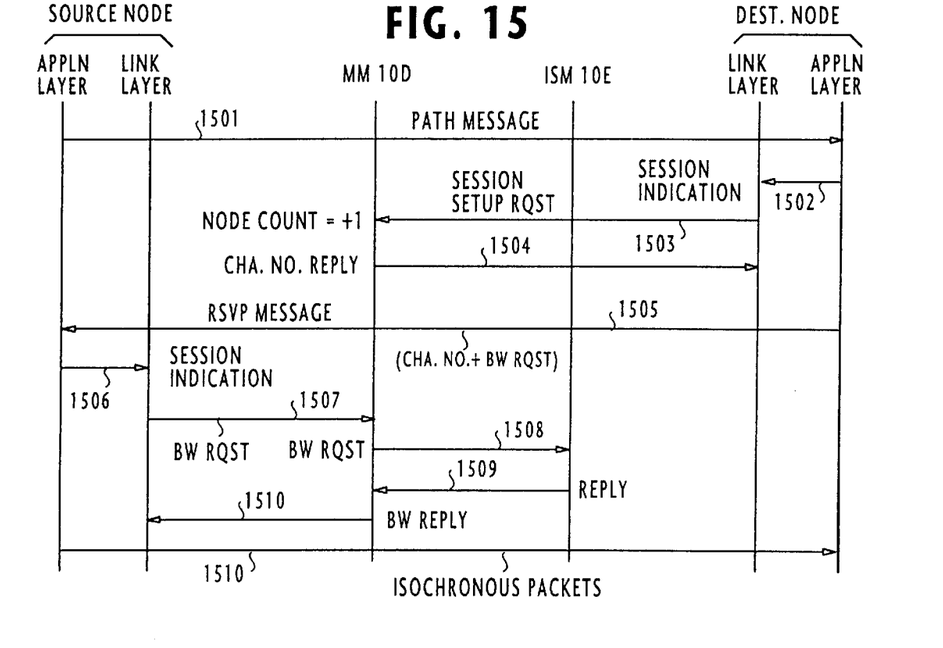
Figure 16:
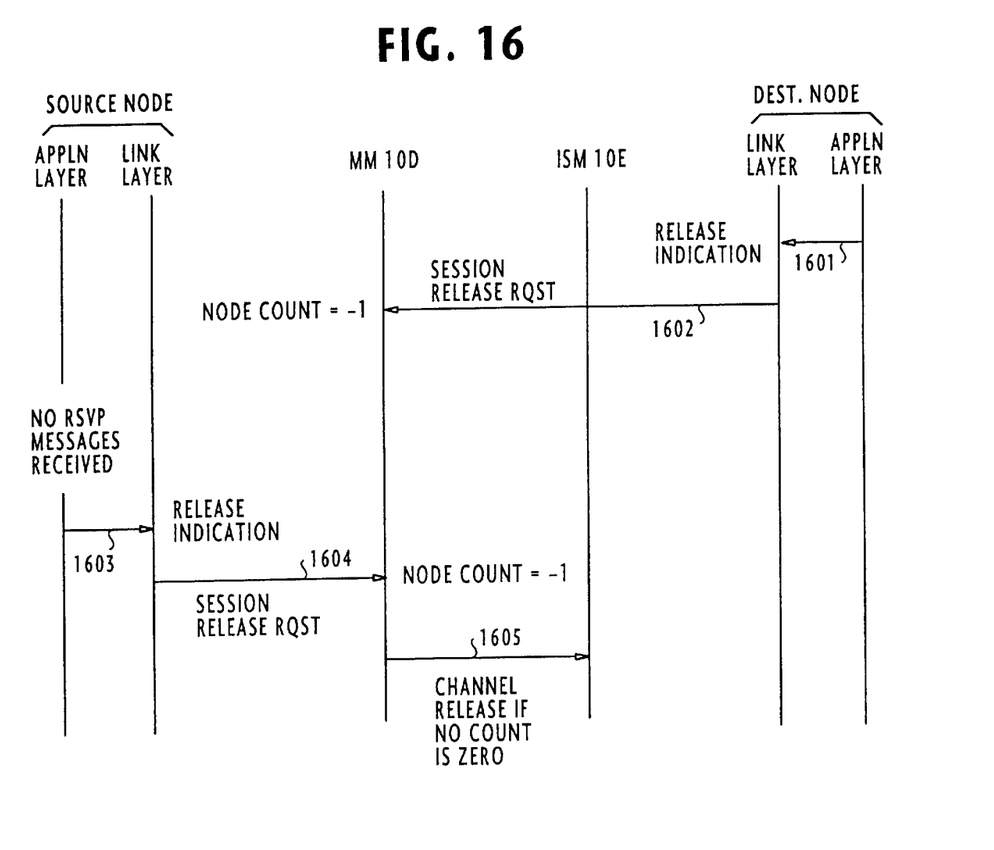

The operation of the isochronous transactions will be fully understood by the following description with the aid of the sequence diagrams of FIGS. 14 to 16.

In FIG. 14, the application layer of source node 10A initially transmits a "path" message 1401 to the application layer of destination node 10C, which responds by issuing to its link layer a session setup indication 1402. The link layer of destination node 10C sends a session (isochronous-mode) channel setup packet 1403 to the multicast manager 10D. In response, the multicast manager searches the channel allocation table 20 and sends a channel request 1404 to the isochronous resource manager 10E since no channel number is assigned to the session. A channel number is assigned by the isochronous resource manager and informed to the multicast manager 10D via a reply packet 1405. Multicast manager 10D sets a "1" into the node count field of allocation table 20 and sends a reply packet 1406 to the destination node 10C to inform it of the assigned channel number. A reservation message 1407 is then sent from the application layer of destination node 10C to the application layer of source node 10A to inform it of the bandwidth the destination node wishes to receive.

The application layer of source node 10A issues a session setup indication 1408 to its link layer, which responds with the transmission of a session channel setup packet 1409 to the multicast manager for requesting the bandwidth desired by the destination node 10C. Multicast manager 10D requests with a message 1410 to the isochronous resource manager to obtain the necessary bandwidth with a reply message 1411. The allocated bandwidth is informed with a reply packet 1412 to the requesting source node 10A, whose application layer is now conditioned to send isochronous packets 1413 at constant rate to the application layer of destination node 10C. Destination node 10C receives isochronous packets if they contain the same channel number and session values as those indicated by the reply packet 1406.

In FIG. 15, with a session being established as described above, if the application layer of another source node sends a "path" message 1501 to the destination node 10C, the link layer of destination node 10C sends a session channel setup packet 1503 to the multicast manager 10D in response to a session setup indication 1502 from the application layer of node 10C. Multicast manager then searches the channel allocation table 20 and sends no channel request to the isochronous resource manager since a channel number has been assigned to the session. Multicast manager 10D increments the node count by one and sends a reply packet 1504 to the destination node 10C to inform it of the assigned channel number and the session values (source node address, protocol number and port number). A reservation message 1505 is then sent from the application layer of destination node 10C to the application layer of source node to inform it of the bandwidth it wishes to receive. The application layer of source node responds with a session setup indication 1506 issued to its link layer, which responds with the transmission of a session channel setup packet 1507 to the multicast manager for requesting the bandwidth desired by the destination node 10C. Multicast manager 10D requests with a message 1508 to the isochronous resource manager to increase or decrease the allocated bandwidth depending on the bandwidth requested by the destination node. The reallocated bandwidth is communicated with a reply message 1509 to the source node, whose application layer is now conditioned to send isochronous packets 1510 at constant rate to the application layer of destination node. Destination node receives isochronous packets if they contain the same channel number and session values as those indicated by the reply packet 1504.

As illustrated in FIG. 16, a session release indication 1601 is issued from the application layer of a destination node to its link layer, which responds with the transmission of a session release packet 1602 to the multicast manager 10D. The node count value at the multicast manager is decremented by one. The application layer at a source node monitors the arrival of reservation messages. If they do not arrive for a predetermined interval, the source node application layer issues a session release indication 1603 to its link layer, which responds with the transmission of a session release packet 1604 to the multicast manager, which decrements the node count value by one. If the node count value reduces to zero, the multicast manager sends a channel release packet 1605 to the isochronous resource manager to release the ownership of the allocated channel number and bandwidth.

What is claimed is:

1. A communication network comprising:
   a plurality of IEEE-1394 nodes connected to a serial bus, each of the nodes functioning as a source node or a destination node for signaling an asynchronous channel setup request containing a multicast address and signaling an asynchronous channel release request; and
   a multicast manager connected to said serial bus, said multicast manager comprising a channel allocation table having a plurality of entries each mapping a channel number to a multicast address,
   said multicast manager being responsive to said asynchronous channel setup request for making a search through said table, setting a node count value to 1, acquiring ownership of a channel number from an IEEE-1394 isochronous resource manager and mapping the acquired channel number to the multicast address of said request in a corresponding entry of said table if no channel number was mapped to said multicast address during said search or incrementing the node count value by 1 if a channel number is mapped to said multicast address during said search, and signaling a reply message on said bus,
   said source node being responsive to said reply message from the multicast manager for multicasting asynchronous stream packets to said bus,
   said multicast manager being responsive to said asynchronous channel release request for decrementing the node count value by 1, said multicast manager restoring the ownership of said channel number to said isochronous resource manager and clearing the corresponding entry of said table when said node count value equals zero.

2. The communication network of claim 1, wherein said source node is arranged to signal said asynchronous channel release request on said serial bus if there is no asynchronous stream packet to be produced on said serial bus for a predetermined period of time.

3. The communication network of claim 1, wherein each of said source node and said destination node is arranged to signal on said bus an isochronous channel setup request containing session data and signaling an isochronous channel release request,
   said multicast manager being responsive to said isochronous channel setup request for making a search through said table, setting a node count value to 1, acquiring ownership of a channel resource from said isochronous resource manager and mapping a channel number of said acquired channel resource to the session data of said request in a corresponding entry of said table if no channel number was mapped to said session data or incrementing the node count value by 1 if a channel number is mapped to said session data, and signaling a reply message on said bus,
   said source node being responsive to a said reply message from the multicast manager for multicasting isochronous packets to said bus,
   said multicast manager being responsive to said channel release request for decrementing the node count value by 1, said multicast manager restoring the ownership of said channel resource to said isochronous resource manager and clearing the corresponding entry of said table when said node count value equals zero.

4. A communication network comprising:
a plurality of IEEE-1394 nodes connected to a serial bus, each of the nodes functioning as a source node or a destination node for signaling an isochronous channel setup request containing session data and signaling an isochronous channel release request; and
a multicast manager connected to said serial bus, said multicast manager comprising a channel allocation table having a plurality of entries each mapping a channel number to session data,
said multicast manager being responsive to said isochronous channel setup request for making a search through said table, setting a node count value to 1, acquiring ownership of a channel number and necessary channel resource from an IEEE-1394 isochronous resource manager and mapping said channel number and said necessary channel resource to the session data of said request in a corresponding entry of said table if no channel number was mapped to said session data during said search or incrementing the node count value by 1 if a channel number is mapped to said session data during said search, and signaling a reply message,
said source node being responsive to said reply message for multicasting isochronous packets to said bus,
said multicast manager being responsive to said isochronous channel release request for decrementing the node count value by 1, said multicast manager restoring the ownership of said channel number and said channel resource to said isochronous resource manager and clearing the corresponding entry of said table when said node count value equals zero.

5. A communication network comprising:
a plurality of IEEE-1394 nodes connected to a serial bus, each of the nodes functioning as a source node for signaling a path message indicating session data and functioning as a destination node for receiving said path message and signaling a first isochronous channel setup request containing the session data indicated in said path message, each of said source and destination nodes signaling an isochronous channel release request; and
a multicast manager connected to said serial bus, said multicast manager comprising a channel allocation table having a plurality of entries each mapping a channel number to session data,
said multicast manager being responsive to said first isochronous channel setup request for making a search through said table, setting a node count value to 1, acquiring ownership of an isochronous channel number from an IEEE-1394 isochronous resource manager and mapping the acquired channel number to the session data of said request in a corresponding entry of said table if no channel number was mapped to said session data during said search or incrementing the node count value by 1 if a channel number is mapped to said session data during said search, and signaling a first reply message,
said destination node being responsive to said first reply message for signaling a reservation message indicating a desired channel resource, and said source node being responsive to said reservation message for signaling a second isochronous channel setup request containing the channel resource indicated in said reservation message,
said multicast manager being responsive to said second isochronous channel setup request for determining necessary channel resource from a resource value in said corresponding entry of the allocation table, acquiring ownership of the necessary channel resource from said isochronous resource manager and updating the resource value with the acquired channel resource and signaling a second reply message on said bus,
said source node being responsive to said second reply message from the multicast manager for multicasting isochronous packets to said bus,
said multicast manager being responsive to said isochronous channel release request for decrementing the node count value by 1, said multicast manager restoring the ownership of said channel number and said channel resource to said isochronous resource manager and clearing the corresponding entry of said table when said node count value equals zero.

6. The communication network of claim 5, wherein said source node is arranged to signal said isochronous channel release request when said reservation message is not produced on said bus for a predetermined interval of time.

7. A communication method for a network including a plurality of IEEE-1394 nodes connected to a serial bus, one of said nodes comprising a channel allocation table having a plurality of entries, the method comprising the steps of:
a) signaling a request for an asynchronous channel from one of said nodes either functioning as a source node or a destination node;
b) making a search through said table;
c) if no channel number is mapped to a multicast address contained in said request, setting a node count value to 1, acquiring ownership of a channel number from an IEEE-1394 isochronous resource manager and mapping the acquired channel number to the multicast address in a corresponding entry of said table;
d) if a channel number is mapped to said multicast address, incrementing the node count value by 1;
e) multicasting asynchronous stream packets from said source node to said bus;
f) requesting release of the channel from one of said nodes;
g) decrementing the node count value by 1; and
h) repeating the steps (a) to (g) until said node count value equals zero, restoring the ownership of said channel number to said isochronous resource manager and clearing the corresponding entry of said table.

8. The communication method of claim 7, further comprising the steps of:
A) signaling a request for setting up an isochronous channel from one of said nodes either functioning as a source node or a destination node;
B) making a search through said table;
C) if no channel number is mapped to session data contained in said request, setting a node count value to 1, acquiring ownership of an isochronous channel resource and a channel number of said resource from said isochronous resource manager and mapping said channel number and said channel resource to the session data of said request in a corresponding entry of said table;
D) if a channel number is mapped to said session data, incrementing the node count value by 1;
E) multicasting isochronous packets from said source node to said bus;
F) signaling a request for releasing said channel from one of said nodes;

G) decrementing the node count value by 1; and

H) repeating the steps (A) to (G) until said node count value equals zero, restoring the ownership of said channel resource and said channel number to said isochronous resource manager and clearing the corresponding entry of said table.

9. The communication method of claim 7, further comprising the steps of:

A) sending a path message indicating session data from one of said nodes when functioning as a source node;

B) receiving, at one of said nodes when functioning as a destination node, said path message and signaling a first request for setting up an isochronous channel;

C) making a search through said table;

D) if no channel number is mapped to session data contained in said request, setting a node count value to 1, acquiring ownership of an isochronous channel number from said isochronous resource manager and mapping the acquired channel number to the session data of said request in a corresponding entry of said table;

E) if a channel number is mapped to said session data, incrementing the node count value by 1;

F) sending a reservation message from the destination node to said source node, said message containing a channel resource which the destination node wishes to receive;

G) signaling from said source node a second request containing the channel resource indicated in said reservation message;

I) determining necessary channel resource from the channel resource contained in said second request and from a resource value in said corresponding entry of the allocation table, acquiring ownership of the necessary channel resource from said isochronous resource manager and updating the resource value with the acquired channel resource;

J) multicasting isochronous multicast packets from said source node to said bus;

K) signaling from either of said source or destination node a request for releasing the channel;

L) decrementing the node count value by 1; and

M) repeating the steps (A) to (L) until said node count value equals zero, restoring the ownership of said channel number and said channel resource to said isochronous resource manager and clearing the corresponding entry of said table.

10. A communication method for a network including a plurality of IEEE-1394 nodes connected to a serial bus, one of said nodes comprising a channel allocation table having a plurality of entries each mapping a channel number to session data, the method comprising the steps of:

a) signaling a request for setting up an isochronous channel from one of said nodes either functioning as a source node or a destination node;

b) making a search through said table;

c) if no channel number is mapped to session data contained in said request, setting a node count value to 1, acquiring ownership of a channel number and an isochronous channel resource from an IEEE-1394 isochronous resource manager and mapping the acquired channel number and said channel resource to the session data of said request in a corresponding entry of said table;

d) if a channel number is mapped to said session data, incrementing the node count value by 1;

e) multicasting isochronous packets from said source node to said bus;

f) signaling a request for releasing the channel resource;

g) decrementing the node count value by 1; and h) repeating the steps (a) to (g) until said node count value equals zero, restoring the ownership of said channel number and said channel resource to said isochronous resource manager and clearing the corresponding entry of said table.

11. A communication method for a network including a plurality of IEEE-1394 nodes connected to a serial bus, one of said nodes comprising a channel allocation table having a plurality of entries each mapping a channel number to a multicast address, the method comprising the steps of:

a) sending a path message from one of said nodes when functioning as a source node;

b) receiving, at one of said nodes when functioning as a destination node, said path message and signaling a first request for setting up an isochronous channel;

c) making a search through said table;

d) if no channel number is mapped to session data contained in said first request, setting a node count value to 1, acquiring ownership of an isochronous channel number from an IEEE-1394 isochronous resource manager and mapping the acquired channel number to the session data of said request in a corresponding entry of said table;

e) if a channel number is mapped to said session data, incrementing the node count value by 1;

f) sending from said destination node a reservation message containing a channel resource the destination node wishes to receive;

g) signaling a second request from said source node, said request containing the channel resource indicated in said reservation message;

h) determining necessary channel resource from the channel resource indicated in the second request and from a resource value in said corresponding entry of the allocation table, acquiring ownership of the necessary channel resource from said isochronous resource manager and updating said resource value with the acquired channel resource;

i) multicasting isochronous packets from said source node to said bus in response to said second reply request;

j) signaling a request for releasing the channel resource from either of said source or destination node;

k) decrementing the node count value by 1; and l) repeating the steps (a) to (k) until said node count value equals zero, restoring the ownership of said channel number and the acquired channel resource to said isochronous resource manager and clearing the corresponding entry of said table.

\* \* \* \* \*